United States Patent Office 3,736,310
Patented May 29, 1973

3,736,310
PROCESS FOR PRODUCING DIHYDRO-PYRIDACENE POLYMERS WHICH ARE FREE OF INTER-MOLECULAR CROSS-LINKING
Klaus Hannes Gump, Gillette, and Dagobert Engelbert Stuetz, Westfield, N.J., assignors to Celanese Corporation, New York, N.Y.
No Drawing. Filed Nov. 10, 1970, Ser. No. 88,489
Int. Cl. C08f 3/76, 15/22, 27/00
U.S. Cl. 260—88.7 R                          12 Claims

ABSTRACT OF THE DISCLOSURE

An improved process is provided for the conversion of an acrylic polymer to a form exhibiting increased thermal stability wherein pendant nitrile groups are catalytically cyclized to form a product which is free of intermolecular cross-linking. The cyclization reaction is conducted at an elevated temperature in an oxygen-free zone in the presence of 2-pyrrolidinone which has been found capable of catalytizing the reaction. The cyclization reaction may be conducted (1) in the homogeneous phase with the acrylic polymer being initially dissolved in 2-pyrrolidinone, or (2) by way of a slurry transformation technique.

The resulting polymeric product may be utilized as an adhesive, a coating polymer, a matrix polymer, or formed into shaped articles, such as fibers or films.

In a preferred embodiment of the process an acrylonitrile homopolymer is fully cyclized to form dihydropyridacene homopolymer which is free of inter-molecular cross-linking.

BACKGROUND OF THE INVENTION

In the past various procedures have been proposed for the conversion of acrylic polymers to a modified form possessing enhanced thermal stability. Such modification has generally been accomplished by heating the acrylic polymer while in fiber form in an oxygen-containing atmosphere, such as ordinary air, at moderate temperatures for extended periods of time. The resulting product may be suitable for use as an intermediate in the formation of carbonized fibrous materials, or for direct utilization as a fire resistant fiber. U.S. Pat. Nos. 2,913,802 to Barnett and 3,285,696 to Tsunoda disclose representative processes for the conversion of acrylic fibers of acrylonitrile homopolymers or copolymers to a heat resistant form by heating in an oxygen-containing atmosphere. The thermal stabilization of fibers of acrylonitrile homopolymers and copolymers in an oxygen-containing atmosphere involves (1) an oxidative cross-linking reaction of adjoining molecules as well as (2) a cyclization reaction wherein a portion of the pendant nitrile groups are condensed to a dihydropyridine structure. While the reaction mechanism is complex and not readily explainable, it is believed that these two reactions occur concurrently according to the prior art, or are to some extent competing reactions. The cyclization reaction is exothermic and must be controlled if the fibrous configuration of the acrylic polymer undergoing stabilization is to be preserved.

Belgian Pat. No. 678,679 and French Pat. No. 1,471,-993 disclose heating an acrylic polymer while in fiber form in an inert atmosphere (e.g. a gaseous nitrogen atmosphere) in order to effect the thermal stabilization of the same. The product resulting from such treatment is not only cyclized to a substantial degree, but also includes inter-molecular cross-linking.

Various techniques for catalyzing the thermal stabilization of acrylic polymers have also been developed. See, for instance, commonly assigned Ser. Nos. 777,901 (now U.S. Pat. No. 3,592,595) and 777,902 (now U.S. Pat. No. 3,647,770), filed Nov. 21, 1968, which involve the Lewis acid catalysis of the cyclization reaction. Subsequently, it has been found that while substantial cyclization of pendant nitrile groups results in such processes, the maximum degree of cyclization attainable is about 30 percent. In other words, no more than about 30 percent of the pendant nitrile groups (—C≡N) are converted to carbimide groups

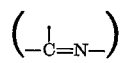

with the remaining pendant nitrile groups being uncyclized. Additionally, substantial inter-molecular cross-linking commonly occurs in such processes as evidenced by insolubility in conventional solvent. Accordingly, if the precursor is an acrylonitrile homopolymer, the resulting cyclized polymer prior to any optional heating in an oxygen-containing atmosphere is a copolymer consisting of up to about 30 mol percent polydihydropyridacene units combined with at least about 70 mol percent of acrylonitrile units with the adjoining molecules of the copolymer being cross-linked. After heating in an oxygen-containing atmosphere, as described, a copolymer is formed consisting of up to about 30 mol percent of polypyridacene units combined with at least about 70 mol percent of acrylonitrile units wherein the adjoining polymer chains are in a cross-linked relationship. During such heating each monomer unit of the polydihydropyridacene portion of the polymer chains undergoes deprotonization and tends to lose two hydrogen atoms.

In our commonly assigned Ser. No. 88,487, filed concurrently herewith, is disclosed a process for producing novel dihydropyridacene polymers which are free of inter-molecular cross-linking wherein acrylic polymers are subjected to a cyclization reaction in an oxygen-free zone which is catalyzed by an organic cyclization promoting agent selected from the group consisting of a carboxylic acid, a sulfonic acid, and a phenol, or alternatively, by use of a Lewis acid cyclization promoting agent in combination with the organc cyclization promoting agent.

It is an object of the present invention to provide an improved process for producing fully cyclized dihydropyridacene polymers which are free of inter-molecular cross-linking.

It is an object of the present invention to provide an improved process for increasing the thermal stability of acrylic polymers.

It is an object of the present invention to provide an improved process for converting acrylic polymers to a fully cyclized form which is suitable for use in the formation of high temperature resistant fibers.

It is a further object of the present invention to provide a process for producing a high temperature resistant polymeric material which is suitable for use as a precursor in the formation of carbon fibers.

These and other objects, as well as the scope, nature, and utilzation of the invention, will be apparent from the following detailed description and appended claims.

SUMMARY OF THE INVENTION

It has been found that an improved process for converting an acrylic polymer selected from the group consisting of an acrylonitrile homopolymer and acrylonitrile copolymers containing at least about 85 mol percent of acrylonitrile units and up to about 15 mol percent of monovinyl units copolymerized therewith to a cyclized form in the absence of inter-molecular cross-linking comprises (a) providing a mixture of said acrylic polymer and 2-pyrrolidinone, (b) heating said mixture while present in an essentially oxygen-free zone at a temperature of about 130 to 220° C. for about 2 minutes to 16 hours, and (c) recovering the resulting cyclized polymer.

A dihydropyridacene polymer is produced in which the pendant nitrile groups are completely cyclized and the polymer chains are free of inter-molecular cross-linking.

DESCRIPTION OF THE PREFERRED EMBODIMENTS

The acrylic polymer which is utilized as the starting material is either (1) an acrylonitrile homopolymer, or (2) an acrylonitrile copolymer containing at least about 85 mol percent of acrylonitrile units and up to about 15 mol percent of one or more monovinyl units copolymerized therewith. Acrylonitrile homopolymers are particularly preferred for use in the present process. The preferred acrylonitrile copolymers contain at least about 95 mol percent of acrylonitrile units and up to about 5 mole percent of one or more monovinyl units copolymerized therewith. Suitable monovinyl units include styrene, methyl acrylate, methyl methacrylate, vinyl acetate, vinyl chloride, vinylidene chloride, vinyl pyridine, and the like, or a plurality of such comonomers.

It has been found that the molecular weight of the resulting dihydropyridacene polymer formed in accordance with the present process is generally directly proportional to the molecular weight of the acrylic polymer starting material. When it is desired to employ the resulting dihydropyridacene polymer in the formation of shaped articles such as fibers, it is recommended that the acrylic precursor have a molecular weight of at least about 50,000, and preferably about 100,000 to 250,000, as determined by inherent viscosity in N,N-dimethylformamide and the equation $[\eta]_{25}=2.43\times10^{-4} M^{0.75}$. When it is desired to employ the resulting dihydropyridacene polymer as an adhesive or a coating material, then the acrylic precursor may optionally have a substantially lower molecular weight. For instance, an acrylic polymer having a molecular weight of 40,000, or even lower, may be selected.

The cyclization reaction of the present process is conducted in the presence of 2-pyrrolidinone. This key compound which is utilized in the process possesses the structural formula:

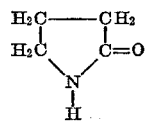

and is sometimes identified as gamma-butyrolactam, 2-ketopyrrolidine, piperidinic acid anhydride, piperidinic acid lactam, pyrroldinone, and pyrrolidone.

The acrylic polymer which is in admixture with 2-pyrrolidinone during its conversion to dihydropyridacene polymer may be either completely dissolved therein to form a single homogeneous phase, or at least partially suspended in a liquid phase which includes 2-pyrrolidinone. In the later slurry transformation procedure, it is recommended that the acrylic polymer be in a particulate form. For instance, it is preferred that the acrylic polymer starting material have a particle size of about 10 to 1000 microns (longest dimension), and about 20 to 80 microns in a particularly preferred embodiment of the process. However, the particle size of the particulate starting material may be varied over a considerably broader range.

When the reaction mixture is an essentially homogeneous solution, it is recommended that the concentration of said acrylic polymer in said solution be about 0.5 to 30 percent by weight based upon the weight of the total solution and preferably in a concentration of about 5 to 15 percent by weight based upon the weight of the total solution. The solvent for such a solution may be either 2-pyrrolidinone or a combination of 2-pyrrolidinone together with a catalytically inert solvent for said acrylic polymer such as N,N-dimethylformamide, N,N-dimethylacetamide, dimethyl sulfoxide, butyrolactone, N-methyl-2-pyrrolidone, ethylene carbonate, etc. So that the cyclization reaction will proceed at a practical rate it is preferred that the acrylic solvent utilized possesses at least about 20 percent by weight 2-pyrrolidinone, and at least about 50 percent by weight 2-pyrrolidinone in a particularly preferred embodiment of the process. The solubility of the acrylic polymer increases with increasing temperature and dissolution is commonly conducted at a temperature of about 60 to 80° C. prior to attaining the reaction temperature (discussed hereafter).

For ease of operation it is preferred, however, that the cyclization reaction be conducted under conditions wherein the bulk of polymer is present in particulate form and the 2-pyrrolidinone is present with a non-solvent for the acrylic polymer. This technique overcomes handling difficulties encountered when an essentially homogeneous solution is utilized since under such conditions the viscosity of the solution substantially increases as the reaction progresses. When the bulk of the acrylic polymer is present in particulate form, a free flowing slurry is maintained with only a slight viscosity increase being observed even when the cyclization reaction has reached completion.

When the preferred slurry transformation procedure is selected, the acrylic polymer is suspended in the liquid phase while in particulate form in a concentration of about 0.5 to 30 percent by weight based upon the total weight of the liquid phase (preferably 5 to 15 percent by weight), and the liquid phase comprises about 10 to 70 percent by weight 2-pyrrolidinone (preferably 50 to 70 percent by weight), and about 30 to 90 percent by weight of an organic non-solvent for the acrylic polymer (preferably about 30 to 50 percent by weight). The liquid phase under such conditions may contain, however, a relatively minor additional quantity of dissolved acrylic polymer at the time the cyclization reaction is initiated.

The organic non-solvent for the acrylic polymer is essentially inert under the reaction conditions, and merely serves as a vehicle which while being miscible with 2-pyrrolidinone prevents the major portion of the acrylic polymer dissolving therein. For instance, the organic non-solvent may be a hydrocarbon such as diphenyl methane, mesitylene, durene, biphenyl, and the like. Additional representative compounds which may be utilized as an organic non-solvent include diphenylether, ethylene glycol, glycerol, and the like. It is preferred that the boiling point of the organic non-solvent be in excess of the maximum temperature experienced by the reaction mixture so that the process may be conveniently conducted under atmospheric conditions. If, however, one chooses to operate the process under superatmospheric conditions organic non-solvents of substantially lower boiling points may be selected. The preferred organic non-solvent for use in the process is ethylene glycol.

While present in an oxygen-free environment, the mixture of acrylic polymer and 2-pyrrolidinone is heated, preferably with continuous agitation, at a temperature of about 130 to 220° C. (preferably 160 to 200° C.) for about 2 minutes to 16 hours to form the completely cyclized dihydropyridacene polymer. The duration of the heating is generally inversely proportional to the temperature selected. Accordingly, longer heating times will be required to complete cyclization at 120° C. than at 220° C. At higher reaction temperature, e.g. above about 160° C., there is observed, however, an increased tendency for polymer chain scission to occur thereby producing a product of generally lower molecular weight.

The heat treatment of the present process may be conducted in any apparatus capable of maintaining the reaction mixture at the desired temperature while preventing contact between the solution and molecular oxygen. Representative apparatus include a resin kettle, an autoclave, pressure tubes, etc. A convenient method for excluding the presence of oxygen is to blanket the solution with an inert gaseous atmosphere such as nitrogen, argon, or helium. One may alternatively carry out the reaction at superatmospheric pressures as previously indicated.

It has been found that in each embodiment of the process a completely cyclized dihydropyridacene polymer product is formed in the absence of inter-molecular cross-linking. The theory whereby 2-pyrrolidinone is capable of promoting the cyclization reaction is considered complex and incapable of simple explanation. It is considered likely, however, that even in the slurry transformation embodiment, the reaction occurs in the homogenous phase. More specifically, a portion of the acrylic polymer dissolves in the liquid phase where it undergoes cyclization of the pendant nitrile groups present in the acrylonitrile units, and again passes into the solid phase.

At the conclusion of the heat treatment the resulting dihydropyridacene polymer may be recovered by conventional techniques. The resulting dihydropyridacene is insoluble in the liquid phase and may be recovered by filtration. Absorbed liquids derived from the liquid phase may be removed from the solid product by extraction with chlorinated hydrocarbons, such as methylene chloride. The resulting polymer again may be separated by filtration, washed, and dried such as by placing in a vacuum chamber (e.g. at 10 mm. Hg) provided at a slightly elevated temperature, e.g. 50 to 100° C.

In accordance with the present improved process, a dihydropyridacene polymer is formed which is free of inter-molecular cross-linking consisting of 85 to 100 mol percent of acrylonitrile units wherein the pendant nitrile groups thereof are fully cyclized, and 0 to 15 mol percent of copolymerized monovinyl units. In a preferred embodiment of the process wherein the starting polymer is an acrylonitrile homopolymer the dihydropyridacene polymer is free of inter-molecular cross-linking and consists of 100 mol percent of acrylonitrile units wherein the pendant nitrile groups thereof are fully cyclized. Such preferred polymer product consists of recurring units of the structural formula indicated below where (I) represents the recurring structure of the starting material (e.g. 4 acrylonitrile units), and (II) represents the structure of the fully cyclized product.

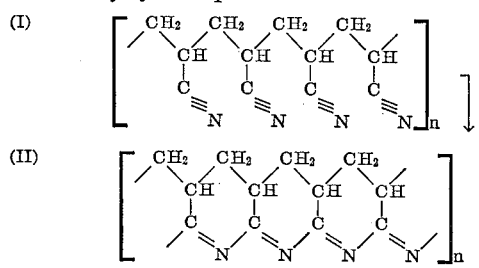

When dihydropyridacene copolymers are formed containing 0 to 15 mol percent of copolymerized monovinyl units the structural formula of the polymer is directly analogous to that of (II) with the exception that the monovinyl units are randomly dispersed within the polymer chain.

The resulting polymers which are linear in nature and may be termed "ladder" polymers are commonly light brown to reddish brown in color. These polymers are insoluble in all common acrylic solvents, but can be dissolved in formic acid, sulfuric acid, trifluoroacetic acid, and mixtures of these acids with N,N-dimethylformamide, acetonitrile, ethylene glycol, etc.

The complete cyclization of pendant nitrile groups within the polymer product may be confirmed by infrared analysis, differential thermal analysis, and thermogravimetric analysis. The absence of inter-molecular cross-linking within the polymer product may be confirmed by product solubility.

When the dihydropyridacene homopolymer is subjected to thermal gravimetric analysis wherein the polymer product is heated from room temperature in an air atmosphere at a rate of 20° C. per minute, no weight loss is commonly observed when temperatures of 375° C. or more are reached. Conversely, an acrylonitrile homopolymer commonly experiences a 30 to 40 percent weight loss when a temperature in the range of 265 to 300° C. is reached. Differential thermal analysis of the polymer product indicates that the explosive exotherm exhibited when an acrylic polymer is heated to a temperature of about 300 to 310° C. is completely absent. Additionally, infra-red analysis of the polymer product indicates a complete absence of nitrile (—C≡N) absorption and the prominent presence of a conjugated

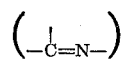

structure.

The polymer product of the present invention is particularly suited for use in applications where high temperature resistance is required. It is suitable for use as an adhesive, a coating polymer, a matrix polymer, or for use in the formation of shaped articles, such as fibers or films. For instance, the polymer may be dissolved in an acidic solvent, and applied as a tenacious protective coating of high scratch resistance. Fibers or films of the product may be spun or cast. For instance, the polymer may be dissolved in a formic acid solvent, and extruded through an appropriate orifice into a coagulation bath of methylene chloride. Alternatively, the product may be dissolved in a trifluoroacetic acid solvent, and extruded into an evaporative atmosphere of nitrogen.

Fibers formed of the dihydropyridacene polymer are particularly suitable for use as a precursor for thermal conversion into a carbon or graphite fiber.

The following examples are given as specific illustrations of the invention. It should be understood, however, that the invention is not limited to the specific details set forth in the examples.

EXAMPLE I

A polyacrylonitrile homopolymer having a molecular weight of about 230,000 and an intrinsic viscosity (I.V.) at 25° C. of about 5.00 dl./g. when dissolved in N,N-dimethylformamide in a concentration of 0.5 percent by weight was selected as the starting material. The acrylic polymer while in particulate form was suspended by central agitation in 2-pyrrolidinone present at about 20° C. in a reaction flask. The quantity of acrylic polymer added to the 2-pyrrolidinone was 15 percent by weight based upon the total weight of the suspension. The reaction flask was next extensively flushed with prepurified nitrogen for 30 minutes, sealed, and the contents of the reactor heated to 200° C. at a rate of temperature increase of about 10° C. per minute while agitation continued. When the contents of the reactor reached a temperature of about 80° C., the acrylic polymer was completely dissolved to form a homogeneous solution. The solution was heated at 200° C. for about 15 minutes. As the reaction progressed the solution assumed a viscous consistency and the dihydropyridacene polymer product precipitated out of the solution. After cooling to room temperature, the contents of the reactor were separated by filtration and treated under high shear conditions with methylene chloride to remove absorbed 2-pyrrolidinone. The product was again separated by filtration and dried in a partial vacuum of about 10 mm. Hg at 60° C. for 24 hours.

The resulting polymer was light brown in color, and was found to be dihydropyridacene homopolymer which was free of inter-molecular cross-linking. The pendant nitrile groups of the acrylonitrile units were fully cyclized. The I.V. of the product was found to be 0.58 dl./g. at 25° C. when dissolved in sulfuric acid in a concentration of 0.1 percent by weight.

EXAMPLE II

Example I was repeated employing as the starting material three different acrylonitrile homopolymers of varying molecular weight. A fully cyclized dihydropyridacene homopolymer was obtained in each instance which was free of inter-molecular cross-linking. The relative molecular weights of the starting materials and of the products are indicated as follows:

| Run No. | I.V. of starting material, dl./g. | I.V. of product, dl./g. |
| --- | --- | --- |
| 1 | 1.68 | 0.30 |
| 2 | 3.2 | 0.39 |
| 3 | 5.0 | 0.58 |

The I.V. of the starting material was determined at 25° C. when dissolved in N,N-dimethylformamide in a concentration of 0.5 percent by weight. The I.V. of the product was determined at 25° C. when dissolved in sulfuric acid in a concentration of 0.1 percent by weight. The comparative values achieved indicates that the molecular weight of the product tends to increase with the molecular weight of the starting material.

EXAMPLE III

Example I was repeated with the exception that identical suspensions of the acrylonitrile homopolymer were elevated to various maximum temperatures and the approximate times required at the maximum temperatures to complete the cyclization of pendant nitrile groups of the acrylonitrile units to form a dihydropyridacene homopolymer which was free of inter-molecular cross-linking were recorded. The results are summarized in the following table:

| Run No. | Reaction temperature,° C. | Time at reaction temperature, sec. | I.V. of product, dl./g. |
| --- | --- | --- | --- |
| 1 | 160 | 900 | 1.17 |
| 2 | 180 | 420 | 0.92 |
| 3 | 190 | 240 | 0.72 |
| 4 | 200 | 180 | 0.58 |
| 5 | 220 | 90 | 0.36 |

The I.V. of the product was determined at 25° C. when dissolved in sulfuric acid in a concentration of 0.1 percent by weight. The results indicate that the rate at which the cyclization proceeds increases with the reaction temperature. Additionally, a product of higher molecular weight is produced at the more moderate reaction temperatures.

EXAMPLE IV

Example I was repeated with the exception that various quantities of N-methyl-2-pyrrolidone were substituted for the 2-pyrrolidinone, and the results achieved at a reaction temperature of 180° C. were compared. The N-methyl-2-pyrrolidone served as an inert solvent for the acrylic polymer. The "Reaction Time" indicated in the following table is the time required at 180° C. to complete the cyclization of pendant nitrile groups of the acrylonitrile units and to form a dihydropyridacene homopolymer which is free of inter-molecular cross-linking:

| Run No. | Percent by weight 2-pyrrolidinone | Percent by weight N-methyl-2-pyrrolidone | Time reaction temperature, min. |
| --- | --- | --- | --- |
| 1 | 100 | 0 | 7 |
| 2 | 80 | 20 | 8 |
| 3 | 60 | 40 | 10 |
| 4 | 40 | 60 | 17 |
| 5 | 20 | 80 | 35 |
| 6 | 0 | 100 | (¹) |

¹ No reaction.

The results indicate that the cyclization reaction is dependent upon the presence of 2-pyrrolidinone, and that the cyclization reaction time increases as the quantity of the inert solvent, N-methyl-2-pyrrolidone, increases.

EXAMPLE V

Example I was repeated with the exception that the starting material was an acrylonitrile copolymer consisting of 95 mol percent of acrylonitrile units and 5 mol percent of styrene units. The copolymer exhibited an I.V. at 25° C. of 2.4 dl./g. when dissolved in N,N-dimethylformamide in a concentration of 0.5 percent by weight.

The resulting dihydropyridacene polymer was free of intermolecular cross-linking and consisted of 95 mol percent of acrylonitrile units wherein the pendant nitrile groups thereof were fully cyclized and 5 mol percent of copolymerized styrene units. The I.V. of the product was found to be 0.3 dl./g. at 25° C. when dissolved in sulfuric acid in a concentration of 0.1 percent by weight.

EXAMPLE VI

Example I was repeated with the exception that the acrylonitrile homopolymer which was initially present in particulate form was converted to a fully cyclized dihydropyridacene homopolymer which was free of inter-molecular cross-linking through the use of a slurry transformation technique.

The liquid phase comprised 70 percent by weight 2-pyrrolidinone and 30 percent by weight of diphenylmethane. The diphenylmethane served as organic non-solvent for the acrylic polymer. The particulate acrylic polymer was provided in a concentration of 15 percent by weight based upon the total weight of the liquid phase. The polymer products were recovered by filtration, washed with methylene chloride, and dried. Various reaction temperatures were utilized and the times required to form a fully cyclized product were recorded.

| Run No. | Reaction temperature,° C. | Time at reaction temperature, sec. | I.V. of product, M./g. |
| --- | --- | --- | --- |
| 1 | 160 | 18 | 1.38 |
| 2 | 180 | 4 | 1.12 |
| 3 | 200 | 2 | 0.9 |

The I.V. of the product was determined at 25° C. when dissolved in sulfuric acid in a concentration of 0.1 percent by weight. The results indicate that while the cyclization reaction may require a longer period of time when conducted in a slurry, the resulting product tends to be of high molecular weight as indicated by the I.V. determinations.

EXAMPLE VII

Example VI was repeated with the exception that the organic non-solvent for the acrylic polymer was mesitylene.

Substantially similar results were achieved.

EXAMPLE VIII

Example VI was repeated with the exception that the organic non-solvent for the acrylic polymer was diphenyl ether.

Substantially similar results were achieved.

EXAMPLE IX

Example VI was repeated with the exception that the organic non-solvent for the acrylic polymer was ethylene glycol.

Substantially similar results were achieved.

EXAMPLE X

Example VI was repeated with the exception that the acrylonitrile copolymer of Example V served as the starting material.

The resulting dihydropyridacene polymer was free of inter-molecular cross-linking and consisted of 95 mol percent of acrylonitrile units wherein the pendant nitrile groups thereof were fully cyclized and 5 mol percent of copolymerized styrene units.

Although the invention has been described with preferred embodiments, it is to be understood that variations

We claim:

1. A process for converting an acrylic polymer selected from the group consisting of an acrylonitrile homopolymer and acrylonitrile copolymers containing at least about 85 mol percent of acrylonitrile units and up to about 15 mol percent of monovinyl units copolymerized therewith to a fully cyclized form in the absence of inter-molecular cross-linking comprising:
    (a) providing a solution of said acrylic polymer dissolved in a solvent for the same which comprises at least about 20 percent 2-pyrrolidinone by weight,
    (b) heating said solution while present in an essentially oxygen-free zone at a temperature of about 130 to 220° C. for about 2 minutes to 16 hours, and
    (c) recovering the resulting fully cyclized polymer.

2. A process according to claim 1 wherein said acrylic polymer is an acrylonitrile homopolymer.

3. A process according to claim 1 wherein said solution contains said acrylic polymer dissolved therein in a concentration of about 0.5 to 30 percent by weight based upon the weight of the total solution.

4. A process according to claim 1 wherein said solution is heated at a temperature of about 160 to 200° C. while present in said oxygen-free zone.

5. A process according to claim 1 wherein said solvent comprises said 2-pyrrolidinone in combination with a catalytically inert solvent for said acrylic polymer, with said 2-pyrrolidinone being present in said solvent in a concentration of at least about 20 percent by weight.

6. A process for converting an acrylic polymer selected from the group consisting of an acrylonitrile homopolymer and acrylonitrile copolymers containing at least about 85 mol percent of acrylonitrile units and up to about 15 mol percent of monovinyl units copolymerized therewith to a fully cyclized form in the absence of inter-molecular cross-linking comprising:
    (a) providing a liquid phase having suspended therein said acrylic polymer in particulate form in a concentration of about 0.5 to 30 percent by weight based upon the total weight of said liquid phase, said liquid phase comprising about 10 to 70 percent by weight of 2-pyrrolidinone, and about 30 to 90 percent by weight of an organic non-solvent for said acrylic polymer,
    (b) heating said suspension with agitation while present in an essentially oxygen-free zone at a temperature of about 130 to 220° C. for about 2 minutes to 16 hours, and
    (c) recovering the resulting fully cyclized polymer.

7. A process according to claim 6 wherein said acrylic polymer is an acrylonitrile homopolymer.

8. A process according to claim 6 wherein said acrylic polymer in particulate form is suspended in said liquid phase in a concentration of at 5 to 15 percent by weight based upon the total weight of said liquid phase.

9. A process according to claim 6 wherein said liquid phase comprises about 50 to 70 percent by weight of 2-pyrrolidinone, and about 30 to 50 percent by weight of an organic non-solvent for said acrylic polymer.

10. A process according to claim 6 wherein said organic non-solvent for said acrylic polymer is a hydrocarbon having a boiling point in excess of the maximum temperature to which said suspension is heated in said oxygen-free zone.

11. A process according to claim 6 wherein said organic non-solvent for said acrylic polymer is selected from the group consisting of diphenylmethane, mesitylene, durene, biphenyl, diphenylether, ethylene glycol, and glycerol.

12. A process according to claim 6 wherein said mixture is heated at a temperature of about 160 to 200° C. while present in said oxygen-free zone.

References Cited

UNITED STATES PATENTS

| | | | |
|---|---|---|---|
| 3,006,756 | 10/1961 | Volker et al. | 260—88.7 B |
| 3,406,139 | 10/1968 | Hurwitz et al. | 260—85.5 S |
| 3,172,879 | 3/1965 | Ferstandig et al. | 260—85.5 S |

HARRY WONG, JR., Primary Examiner

U.S. Cl. X.R.

8—162; 117—161; 260—29.1 R, 30.2, 30.8 R, 30.8 DS, 31.2 N, 32.2, 32.4, 32.6 N, 33.2 R, 33.4 R, 33.6 UA, 85.5 S; 264—29